United States Patent

[11] 3,609,423

| [72] | Inventors | Willard B. Spring<br>Topsfield;<br>Walter R. Woodward, Carlisle, both of<br>Mass. |
|---|---|---|
| [21] | Appl. No. | 49,835 |
| [22] | Filed | June 25, 1970 |
| [45] | Patented | Sept. 28, 1971 |
| [73] | Assignee | USM Corporation<br>Boston, Mass. |

[54] BRIDGING STRIP FOR DEFLECTABLE ARMATURES
5 Claims, 7 Drawing Figs.

[52] U.S. Cl. .................................................. 310/82, 310/83
[51] Int. Cl. .................................................. H02k 7/00
[50] Field of Search .......................................... 310/49, 83, 193, 821; 74/690

[56] References Cited
UNITED STATES PATENTS
3,496,395  2/1970  Newell ........................ 310/49 X
3,331,974  7/1967  Proctor ....................... 310/83 X Primary Examiner—D. F. Duggan
Attorneys—Richard A. Wise, Richard B. Megley and Carl E. Johnson ABSTRACT: Magnetic material has a unique configuration to reduce reluctance and improve performance of stepping or synchronous motors of the type employing deflectable armatures. Specifically, for instance, to reduce or eliminate nonuniformity of peripheral airgap the outer convolution or a portion thereof of the magnetic strip has its thickness gradually diminishing towards its outer end and/or is provided, at the length of such convolution from its end, with a radial, widthwise extending projection of substantially the same dimension as the thickness of the material at that end. Alternatively, concentric bridging tubes may be employed. A longitudinal slit pattern may be used to reduce eddy currents.

PATENTED SEP 28 1971 3,609,423

Inventors
Willard B. Spring
Walter R. Woodward
By their Attorney

Carl E. Johnson 3,609,423

BRIDGING STRIP FOR DEFLECTABLE ARMATURES

BACKGROUND OF THE INVENTION

In U.S. Pat. No. 3,169,202, issued Feb. 9, 1965 in the names of Herbert W. Proctor et al., there is disclosed in a high-response, low-inertia stepping motor the combination with an electromagnetically deflectible rotor of a coaxial flexible coil of magnetically permeable material. The purpose of the coil is to achieve flexing of the armature from its nonenergized circular shape. Upon energization of a stator, as therein disclosed, the outside layer of the strip becomes most highly saturated with flux and is caused by magnetic forces to assume a lobar shape, usually elliptoidal, which is thereby imposed on the flextube or flexspline. Stepping of the magnetic field, as also disclosed, for instance in U.S. Pat. No. 3,331,974, issued July 18, 1967 in the name of Herbert W. Proctor, causes its radial force to be converted to rotary output, with reduced speed and amplified torque in small, precise steps.

More recently there has issued a U.S. Pat. No. 3,496,395 to Newell having for its principal object the improvement of the operation of magnetic bridging material in actuators of the above-described type. As proposed in this last-mentioned patent the strip of magnetic material would have its outer end portion formed with gradually increasing width, a feature intended to yield better performance but which does not avoid creation of an adverse reluctance gap having a thickness equal to that of the coil stock.

SUMMARY OF THE INVENTION

In view of the foregoing it is a primary object of this invention to provide, in an electromagnetic actuator having a deflectible armature, a further improved magnetic circuit comprising a flexible coil of magnetic strip material having its outer portion of a tapering thickness and/or otherwise formed to create minimum discontinuity and hence minimum total airgap in local stator-armature magnetic loops.

Another object of this invention is to provide for use in a device having, in effect, a rotating magnetic field, a coiled strip of bridging material of the type indicated and which shall have low eddy current loss.

To these ends a thin strip of magnetic metal, sometimes termed shim stock and usually having a nominal thickness of about 0.002 to 0.010 inch (depending on the particular unit), or about 70 to 150 percent of flextube thickness, is provided in a coil of closely wound turns and its outer convolution, though of generally constant width, has a tapering thickness. This diminishing thickness toward the outer end of the strip to an edge preferably less than about 0.001 inch thick ensures less local distortion of the flextube shape and less discontinuity of airgap, and hence improved uniformity of reluctance. In terms of operating results it means a more uniform magnetic pull, reduced stress concentration in the flexspline or flextube, and greater rotational accuracy of the motor output.

In either a strip of constant thickness bridging material, or one feather edged as indicated, a further feature of the invention resides in the provision, one (or more) convolution(s) from the outer end, of a transversely extending step or angular projection of substantially the same thickness or radial dimension as the end thickness of the strip. Additionally, and as shown herein, for reducing eddy current loss, each strip is preferably provided with longitudinally arranged slits which are disposed in staggered relation.

BRIEF DESCRIPTION OF THE DRAWINGS

The foregoing and other features will now be more particularly described in connection with illustrative embodiments and with reference to the accompanying drawings thereof, in which.

DESCRIPTION OF THE PREFERRED EMBODIMENTS

Figure 1:
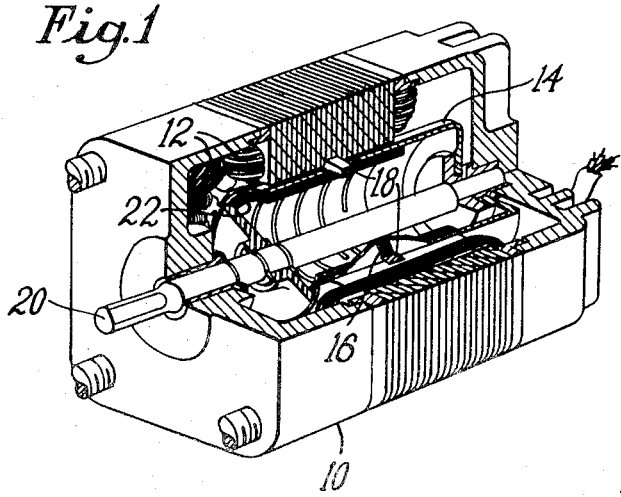
FIG. 1 is a perspective view of a stepping or sychronous motor employing a radially deflecting flexspline or flextube and a novel coiled bridging strip of the type herein featured.

As disclosed in the above-cited patents a high-response stepping actuator comprises a motor frame 10 (FIG. 1) having in coaxial relation therein a circular series of oppositely disposed stator poles 12, a tubular flextube (no teeth) or alternatively, as hereafter referred to, a flexspline 14 (FIGS. 1, 2 and 3) having splines 16, a reaction or circular spline 18 anchored to the stator, and an output shaft 20 journaled in the frame 10 and coupled to the rotatable flexspline 14. In accordance with well-known harmonic drive principles, the inner splined member, in this case the flexspline 14, has fewer spline teeth 16 than the circular spline 18 usually by two (or a multiple of two), the field being energized and magnetically rotated or stepped to radially deflect and rotate the flexspline and its shape and hence its circumferentially spaced localities of meshing with the circular spline. Incidentally, a controller (not herein shown) for sequentially energizing the windings with direct current as just mentioned is disclosed, for example, in U.S. Pat. No. 3,402,334, issued in the name of G. C. Newton, Jr., but no particular form of electromagnetic wave generating circuit is needed or herein shown for producing, in effect, the rotating or stepped magnetic field.

For providing effective magnetically induced radial deflection of the flexspline 14 from its relaxed circular shape to a meshing labor shape, usually elliptoidal, a coil of flexible magnetic bridging material in the form of a strip 22 (FIGS. 1, 2) is disposed on the opposite side of the flexspline from the stator poles. If the strip 22 and hence its coil form is of such configuration as to permit an intervening airgap, most especially a discontinuity or gap adjacent to the wall of the flexspline, the resultant increase in reluctance lowers efficiency of the device. An airgap permitted by a bridging coil more remotely from the flexspline, such as between inner turns of the coil, is far less detrimental than one immediately adjacent to the flexspline. When, therefore, a bridging strip is of substantially constant thickness and merely has its terminal width increasing as proposed in the mentioned Newell patent, there is an airgap created of considerably length extending adjacent to the entire outer terminal edge where the second convolution is about to proceed under that edge.

Figure 2:
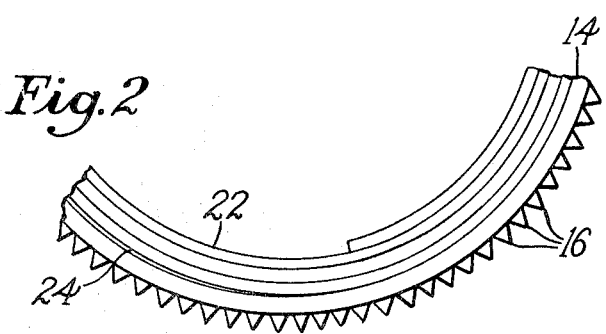
FIG. 2 is an enlarged detail view of a portion of the bridging strip shown in FIG. 1 and showing its tapered thickness in the outer convolution, all turns necessarily having their thickness exaggeratedly shown for clarity.

The present invention provides that the outer terminal portion of the bridging strip 22, preferably over the length of the outer convolution, shall taper in thickness, as best seen in FIG. 2 at a locality designated 24. Thus, if the strip thickness over its inner turns is substantially constant and within the order of from about 0.002 inch to about the order of 0.010 inch, this thickness gradually diminishes to an outer end thickness of less than about 0.001 inch. As a consequence, as illustrated in FIG. 2 there is practically zero airgap adjacent to the inner flexspline wall.

Figure 3:
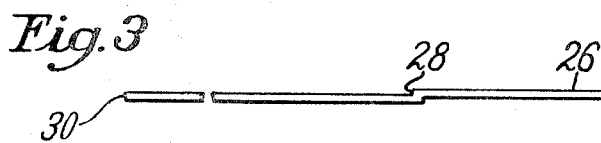
FIG. 3 is an edgewise view of a modified or stepped form of bridging strip prior to being coiled, its thickness being exaggerated.
Figure 4:
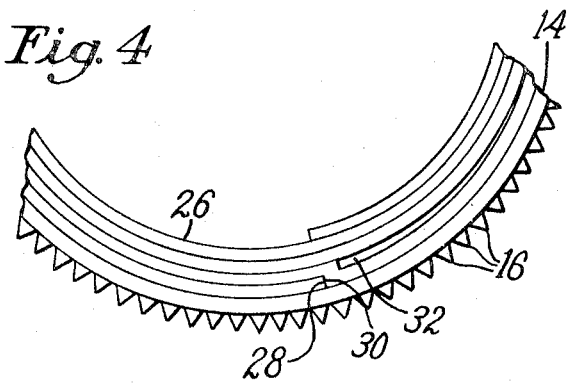
FIG. 4 is a view similar to FIG. 2 and showing the stepped strip of FIG. 3 when wound on itself.

FIGS. 3 and 4 illustrate an alternative construction of a bridging strip 26. While it may have its thickness tapering as above proposed, though not so shown herein, the strip 26 is formed with a widthwise jog or stepped projection 28 which is spaced from its outer end 30 the length of an outer convolution. The projection 28 extends in the thickness dimension to correspond with the terminal thickness of the strip 26. Accordingly, as shown in FIG. 4 on being wound the projection 28 abuts the end 30 leaving a minimal airgap in this critical area adjacent to the flexspline. It is true that, in the absence of additional similar projections located at slightly diminishing intervals along the length of the strip, an airgap 32 (FIG. 4) will occur but its practical effect is usually insignificant because not immediately adjacent to the flexspline. This is to say that the inner airgap 32 does not seriously impede the flow of flux. Should the added expense of production be warranted in a special application the plurality of longitudinally spaced projections mentioned may be provided for optimum elimination of airgaps.

Figure 5:
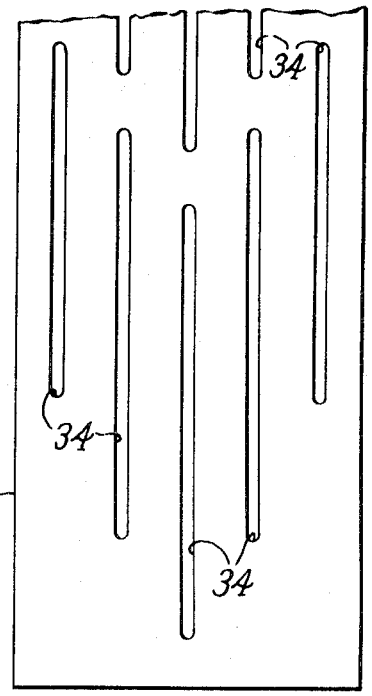
FIG. 5 is a plan view of an unwound outer end portion of a bridging strip as modified to reduce eddy currents.

In the case of either or both of the improved bridging strips 22, 26, an added advantage in efficiency may be realized by providing longitudinal slits 34 (FIGS. 1 and 5) and preferably in staggered echelon pattern, as shown in FIG. 5.

From the foregoing it will be appreciated that the magnetic bridging strips, as herein proposed, need not have an increasing width to eliminate or reduce airgap or discontinuity; their thickness may be tapered and/or their length be formed with one or more projections 28 as described. The bridging material improvements herein disclosed, even if airgaps are not wholly eliminated, are nevertheless very significantly reduced and made more uniform throughout all portions of the flexspline assembly. Magnetic pull can accordingly be more uniformly exerted with greater accuracy provided for each step. The minimized discontinuity also tends to lengthen the service life of the flexspline.

Figure 6:
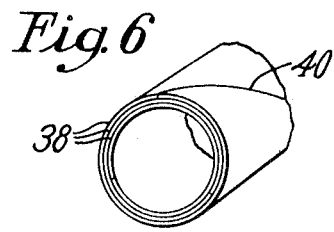
FIG. 6 is a perspective of an alternative magnetic bridge of discrete, welded tubular strips in peripherally contiguous relation.
Figure 7:
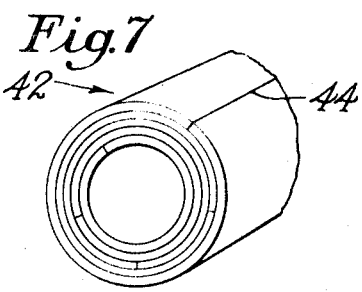
FIG. 7 is a diagrammatic view similar to FIG. 6 except that the weldments are parallel to the axis in the respective laminae.

Although not illustrated herein, an alternate form of magnetic bridge may consist of a plurality of flexible, concentric seamless tubes each having no joint. The assembly may be hydroformed in tight circular configuration and held as by a pair of oppositely disposed rivets. Other alternates somewhat easier to manufacture but also effective in minimizing loss due to airgaps are shown schematically in FIGS. 6 and 7. In FIG. 6 a plurality of magnetic strips 38, each of peripheral length carefully determined to provide surface contact with the periphery of an adjacent strip, is provided. Each discrete strip 38 is cut diagonally to spread the edge effect on more than one pole piece and accordingly has a diagonal joint 40 which may be provided by welding. The thickness of the stock may now be uniform and of the order above indicated. If desired the welded joints 40 may be uniformly angularly spaced in each assembly. FIG. 7 illustrates a magnetic bridge assembly 42 such as that of FIG. 6 but wherein the joints 44 (not shown), commonly a tungsten-inert gas weld, planish, are parallel to the axis and may be angularly spaced. Though not so shown in FIGS. 6 and 7, the coaxial tubes 38 or 42 may also be slit longitudinally in echelon pattern to reduce eddy current.

Having thus described our invention, what we claim as new and desire to secure by Letters Patent of the United States is:

1. In an electromagnetic actuator of the type having in coaxial relation a stator, a rotor including a radially deflectable flexspline and circuit means for energizing the stator to, in effect, create a rotating magnetic field for rotating the magnetically deflected flexspline about its axis, a coiled strip of flexible magnetic bridging material coaxial with the flexspline and in tangential relation thereto, said strip having a tapering thickness along at least a portion of its length tangential to the flexspline and diminishing to the order of about 0.001 inch, the coiled strip being formed with longitudinal slits disposed in staggered relation to reduce eddy current losses.

2. For use in an electromagnetic actuator of the type employing a radially deflectable armature, a coiled strip of flexible magnetic bridging material having one turn closely adjacent to a circumferential surface of the armature, said strip being of substantially uniform thickness and formed with at least one widthwise extending stepped projection, said projection being spaced from the end of the strip when in straightened form by the length of said circumferential surface and having a dimension to correspond with the terminal thickness of the strip whereby airgaps between the coil and the armature surface are minimized.

3. A strip of bridging material as set forth in claim 2 wherein a plurality of uniform elongated slits is disposed longitudinally of the strip and in staggered echelon pattern to reduce eddy current loss.

4. For use in an electromagnetic actuator of the type employing a radially deflectable armature, a magnetic bridge comprising a plurality of coaxial, flexible magnetic tubes each being of substantially uniform thickness and having a peripheral surface in contact with, and throughout the periphery of, an adjacent tube, and one of the tubes having peripheral contact with the armature.

5. A magnetic bridge as set forth in the combination of claim 4 and wherein the respective tubes are provided with longitudinal slits in a pattern to minimize eddy current.